United States Patent
Akers

[15] 3,650,551
[45] Mar. 21, 1972

[54] SELF-SEALING TANK CONNECTOR

[72] Inventor: Edward G. Akers, Raytown, Mo.
[73] Assignee: Borg-Warner Corporation, Chicago, Ill.
[22] Filed: Feb. 8, 1971
[21] Appl. No.: 113,530

[52] U.S. Cl..................................285/158, 85/46, 285/200, 285/209, 285/220, 285/423
[51] Int. Cl............................................F16l 3/04
[58] Field of Search................285/333, 334, 340, 355, 200, 285/208, 213, 214, 220, 221, 158, 209, 192, 423; 85/15 P, 46; 151/69; 222/91, 568

[56] References Cited

UNITED STATES PATENTS

| | | | |
|---|---|---|---|
| 477,308 | 6/1892 | McFarland | 285/220 X |
| 1,159,685 | 11/1915 | Killeter et al. | 285/209 X |
| 2,321,379 | 6/1943 | Green | 85/46 |
| 2,353,030 | 7/1944 | Green | 151/69 |

FOREIGN PATENTS OR APPLICATIONS 106,651    5/1917    Great Britain.........................285/209

*Primary Examiner*—Dave W. Arola
*Attorney*—Donald W. Banner, William S. McCurry and John W. Butcher

[57] ABSTRACT

A fitting having a tapered threaded section, formed by flat-topped threads gradually increasing in height, permits the fitting to be screwed into and permanently retained in an aperture in a wall of a semi-rigid tank. As the threaded section is screwed into the aperture the tank wall distorts increasingly and is then led into an annular relief section, following the threaded section, to captivate the fitting against axial movement. The connector also includes a resilient gasket lying in and encompassing the relief section on the outside of the tank. The gasket is held between, and is compressed by, the tank wall and a flange section of the fitting to provide a fluid-tight seal.

8 Claims, 5 Drawing Figures

Patented March 21, 1972

3,650,551

Inventor
Edward G. Akers

By *Jmn E. Tracy*

Attorney

SELF-SEALING TANK CONNECTOR

BACKGROUND OF THE INVENTION

This invention relates to a novel tank connector to be secured in a hole of a semirigid tank accessible only from the outside. While the connector may be effectively closed and employed merely as a plug for sealing the hole, it may be open from one end to the other to serve as an adapter to facilitate a fluid coupling to and/or from the tank, and will be so described.

Connectors developed heretofore useful for mounting to semirigid fluid-storage tanks, including those tanks made of either metal or plastic, are of relatively expensive construction and time consuming to install. This is due in part to the inaccessibility of the interior of such tanks, requiring that a connector be attached and locked to a tank from the outside. Prior connectors were consequently complex in nature and each included at least three separate, and independently movable, pieces or parts. Accordingly, there is presently a definite need for a tank connector that not only is inexpensive to manufacture but may be rapidly and easily installed. Both of these objectives have now been met by applicant's unique connector. Its cost is substantially less than any previous connector designed to serve the same purpose, and yet it may be quickly and simply affixed to a tank.

It is, therefore, an object of the invention to provide a new, improved and economical self-sealing connector for mounting to a semirigid tank.

Another object is to provide a low cost tank connector that may also be quickly and simply installed.

It is a further object of the invention to provide a unique tank connector which, once affixed to an aperture of a tank, cannot be removed but may be rotated to any desired orientation.

SUMMARY OF THE INVENTION

The self-sealing tank connector of the invention may be permanently and nonremovably secured in an aperture in a wall of a semirigid tank which is accessible only from the outside. The connector comprises a fitting which is turn includes (a) a tapered threaded section to be screwed into the aperture and having at least two flat-topped starting threads gradually increasing from a minimum to a maximum height from the leading to the trailing end of the threaded section, the maximum transverse dimensions at the leading and trailing ends being respectively less than and greater than the diameter of the aperture, (b) a flange section to be located external to the tank and having a maximum dimension substantially greater than the diameter of the aperture, and (c) an annular groove relief section between the threaded and flange sections and having a root diameter less than the maximum transverse dimension of the threaded section at its trailing end. The connector also comprises a resilient gasket lying in and surrounding the relief section and to be positioned external to the tank. As the tapered threaded section is screwed into the aperture, the tank wall is initially deformed or distorted by the flat-topped threads and is then led or directed into the relief section to captivate the connector against removal even if the fitting is subsequently rotated in either direction. The gasket, held between the flange section and the wall, provides a fluid-tight seal.

DESCRIPTION OF THE DRAWING

The features of the invention which are believed to be novel are set forth with particularity in the appended claims. The invention, together with further objects and advantages thereof, may best be understood, however, by reference to the following description in conjunction with the accompanying drawing, in the several figures of which like reference numerals identify like elements, and in which:

DESCRIPTION OF THE ILLUSTRATED EMBODIMENT

Figure 1:
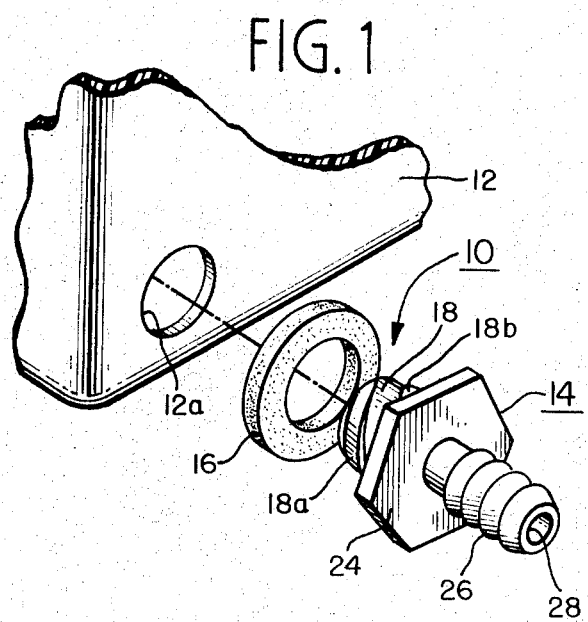
FIG. 1 is a perspective, exploded view of a portion of a fluid storage tank and of a self-sealing tank connector, constructed in accordance with one embodiment of the invention, to be screwed into an aperture in the illustrated tank.
Figure 5:
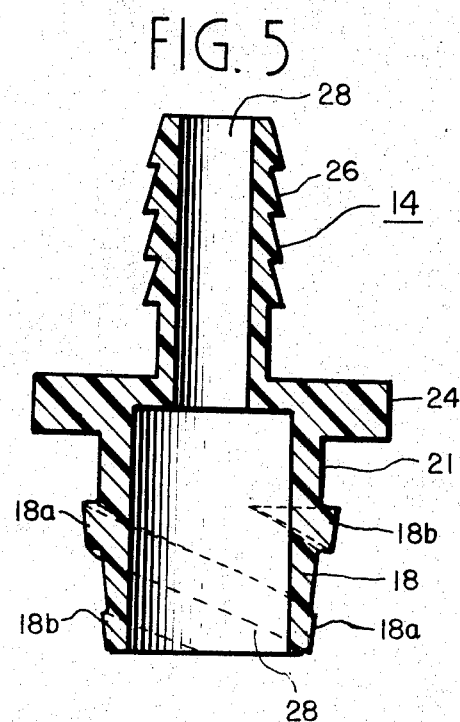
FIG. 5 is a sectional view of only one element (the fitting) of the connector and is taken along section line 5—5 in FIG. 3.

The disclosed tank connector (generally indicated by the reference numeral 10) may be attached to any fluid storage tank whose walls are semirigid or deformable. Hence, tank 12 may be constructed of any suitable material, such as metal or plastic, so long as its walls are susceptible to being distorted. Tank 12 may also be used to store any desired fluid. As one very specific example, the tank may be made of polyethylene plastic and may be employed as a water tank for mobile homes and house trailers.

Connector 10 comprises only two separate elements or pieces—a fitting 14 and a resilient gasket 16. This is in sharp contrast to all prior connectors for tanks. Fitting 14 is divided into and includes four different sections each of which serves a different purpose. In brief the fitting has, between its two ends and in the order named, a tapered threaded section 18, an annular groove relief section 21, a flange section 24, and a nozzle section 26. Fitting 14 may be constructed of any suitable material, such as metal or plastic, and may be formed in any appropriate manner, for example by molding when plastic is used or by die casting when metal is employed.

Figure 2:
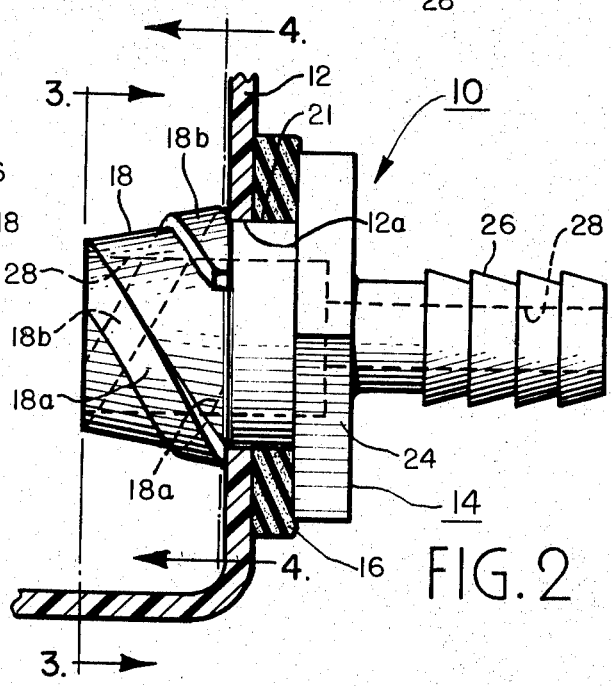
FIG. 2 is a side view of the connector as it appears after it is mounted to the tank.

Considering now the construction of fitting 14 in more detail, two characteristics of the threaded section combine to provide the tapered configuration. Initially, the root diameter gradually increases from a minimum to a maximum dimension from the leading to the trailing end of the threaded section, namely from the left end to the right end of section 18 as viewed in FIG. 2. In addition, and of greater importance, there are two flat-topped or square-cut starting threads 18a, 18b each of which gradually increases from a minimum height (zero in the disclosed embodiment) to a maximum height from the leading to the trailing end of threaded section 18. In the illustrated case, the threads are of the acme type although any flat-topped thread will suffice; for example the buttress type thread can be used. Flat-topped threads are necessary to avoid cutting or grinding material from the peripheral edge of aperture 12a; this is important for reasons to be understood.

Figure 3:
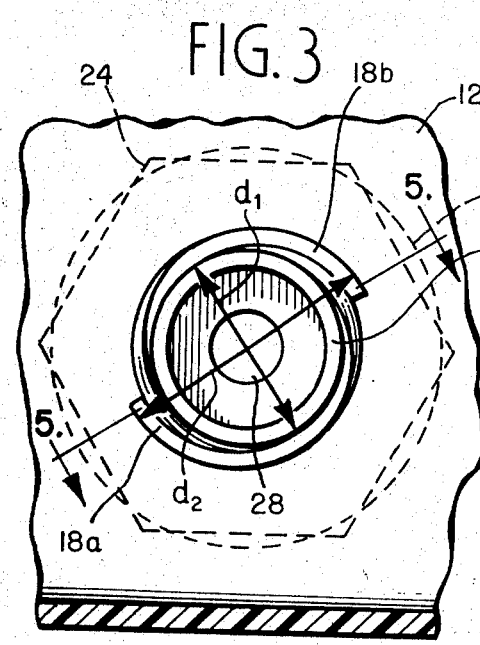
FIG. 3 is a sectional view taken along section line 3—3 in FIG. 2.

Since each of threads 18a, 18b starts out with zero height, threaded section 18 presents a circular cross section at its leading end, as is best seen in FIG. 3. The diameter of that cross section (dimension $d_1$ in FIG. 3) is therefore the maximum transverse dimension at the leading end and this is less than the diameter of aperture 12a in tank 12. The small end of tapered threaded section 18 may thus easily be inserted into aperture 12a as the first step in mounting the connector to the tank. The maximum transverse dimension at the trailing end, indicated by the dimension $d_2$ in FIG. 3, in made greater than the diameter of hole 12a. However, threaded section 18 may still be screwed into the aperture without cutting material from the edge of aperture 12a. After the threaded section is inserted into aperture 12a and then rotated clockwise, the flat-topped threads deform the tank wall surrounding the aperture thereby permitting the threaded section to advance into the aperture. This operation may most easily be done by cocking or canting fitting 14 so that the tank wall follows the root diameter. In this way, the wall is distorted by only one of the threads at a time. Of course, the polygonal shape (six sided in the illustrated embodiment) of flange section 24 allows the use of a wrench for rotating the fitting to simplify further the process of screwing the fitting into the tank wall.

The increasing thread height and root diameter combine to cause increasing distortion of the tank wall as the trailing end approaches and reaches the aperture. Continued clockwise rotation thereafter leads the tank wall into relief section 21, the root diameter of which is less than the dimension $d_2$ and in the illustrated case is equal to the root diameter of the threaded section at its trailing end and this is preferably equal to the diameter of aperture 12a. Hence, when the tank wall enters the relief section it will return or spring back to its original or normal shape. By requiring substantial deformation of the tank wall before it can enter the relief section, captivation of the fitting against axial movement toward the tank exterior is achieved since any subsequent rotation in either direction will be totally ineffective. Once the fitting has been screwed into aperture 12a, there is no way that it can be unscrewed and removed. Of course, since flange section 24 has a maximum dimension substantially greater than the diameter of the aperture, the fitting is locked against axial movement in the direction toward the interior of the tank.

It is to be appreciated that the locked retention of the connector is directly attributable to the use of flat-topped threads which will not grind and remove material from the edge of aperture 12a, as would be the case if standard threads were employed as in a sheet metal screw. With standard threads it would be possible to unscrew the threaded section.

Resilient gasket 16 surrounds relief section 21 on the outside of the tank and is held between flange section 24 and the tank wall to provide a fluidtight seal. Preferably, the gasket is given a normal thickness which, when added to the wall thickness, totals to a dimension greater than the separation between the threaded and flange sections. In this way, the gasket will be compressed to insure a fluidtight seal. This feature is particularly advantageous to compensate for unequal wall thickness.

Figure 4:
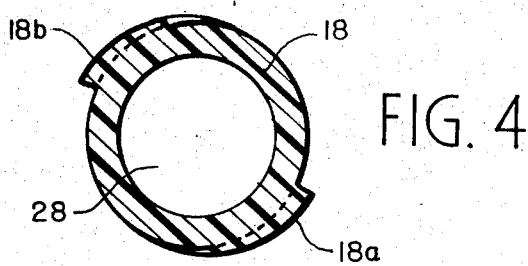
FIG. 4 is a sectional view taken along section line 4—4 in FIG. 2.

Threads 18a and 18b are shaped at the trailing end of the threaded section to maximize the land or contact areas which bear against the internal surface of the tank. These land areas, best seen in FIG. 4, are parallel to the tank wall and extend over approximately 120° of the 360° periphery of the aperture. This has been found to be quite adequate to maintain the connector squarely mounted and to prevent it from cocking. It is to be particularly noted that such wide-angle support is obtained by means of only two starting threads. Of course, additional starting threads could be employed to increase further the extent of contact between the threads and the tank wall.

Tapering of the root diameter from the leading to the trailing end of threaded section 18 has been done to insure a snug fit in the event that the aperture is not properly sized. Such root diameter tapering, however, is not necessary. All that is needed is to increase the thread height in going from the leading to the trailing end.

Fitting 14 is bored or hollowed out to provide a conduit 28 extending along its axis to facilitate fluid flow to and/or from the tank. Nozzle section 26 is barbed so that a hose type fluid line may be attached thereto to couple to conduit 28. If desired, the nozzle section may be elbow shaped and at any required angle for the particular installation for which the connector is designed. Inasmuch as the mounted connector may always be rotated, the elbow fitting can be oriented in any preferred direction over 360°.

Applicant has therefore provided a unique two-piece, fluidtight tank connector that may be installed faster and more simply than any previous connector. Moreover, and of substantial importance, the invention realizes manufacturing economies never even approached heretofore. The cost of applicant's connector is only a small fraction of the cost of any prior connector capable of performing the same function.

While a particular embodiment of the invention has been shown and described, modifications may be made, and it is intended in the appended claims to cover all such modifications as may fall within the true spirit and scope of the invention.

I claim:

1. A self-sealing tank connector for permanent non-removable attachment in an aperture in a wall of a semirigid tank accessible only from the outside, comprising:

a fitting including a tapered threaded section to be screwed into the aperture and having at least two flat-topped starting threads being flat-topped throughout their entire length and gradually increasing from a minimum to a maximum height from the beginning of the leading to the end of the trailing end of said threaded section, the maximum transverse dimensions at the leading and trailing ends being respectively less than and greater than the diameter of the aperture, a flange section attached to said fitting to be located external to the tank and having a maximum transverse dimension substantially greater than the diameter of the aperture, and an annular groove relief section between said threaded and flange sections and having a root diameter less than the maximum transverse dimension of said threaded section at its trailing end;

and a resilient gasket lying in and surrounding said relief section and to be positioned external to the tank;

the tank wall, as said tapered threaded section is screwed into the aperture, initially being deformed by said flat-topped threads and then being led into said relief section to captivate said connector against removal even if said fitting is subsequently rotated in either direction, said gasket being held between said flange section and the wall and providing a fluidtight seal.

2. A self-sealing tank connector according to claim 1 in which said relief section separates said threaded and flange sections a predetermined distance greater than the thickness of the wall, and in which said resilient gasket has a thickness greater than the difference between said predetermined distance and the wall thickness, said gasket being compressed by said flange section and the wall.

3. A self-sealing tank connector according to claim 1 in which each of said threads has substantially zero height at the leading end of said threaded section.

4. A self-sealing tank connector according to claim 1 in which each of said threads is of the acme type.

5. A self-sealing tank connector according to claim 1 in which the root diameter of said threaded section also gradually increases from a minimum to a maximum dimension from the leading to the trailing end, the maximum root diameter equaling that of said relief section.

6. A self-sealing tank connector according to claim 1 in which the periphery of said flange section is polygonally shaped to permit the use of a wrench for rotating said fitting to screw said threaded section into the aperture.

7. A self-sealing tank connector according to claim 1 in which each of said threads is shaped at the trailing end to provide a land area of maximum size and which is parallel to the wall, and in which said gasket introduces a force to press the internal surface of the tank against and in contact with each land area.

8. A self-sealing tank connector according to claim 1 in which said fitting is bored to provide a conduit to facilitate fluid flow from the tank and through said fitting, and in which said fitting also includes a nozzle section to which a fluid line may be attached in order to couple to said conduit.

* * * * *